United States Patent
Arrance

[15] 3,661,644
[45] May 9, 1972

[54] BATTERY CONSTRUCTION HAVING A HONEYCOMB MATRIX WITH CELLS FILLED WITH DIFFERENT ELECTRODE MATERIALS

[72] Inventor: Frank C. Arrance, Costa Mesa, Calif.
[73] Assignee: McDonnell Douglas Corporation, Santa Monica, Calif.
[22] Filed: Dec. 19, 1966
[21] Appl. No.: 603,016

[52] U.S. Cl. ................................ 136/6, 136/143, 136/145, 136/146
[51] Int. Cl. ........................................................ H01m 35/04
[58] Field of Search ................... 136/100, 102, 30, 20, 120, 136/6, 142, 143, 146, 147, 36, 37, 38, 43, 145

[56] References Cited

UNITED STATES PATENTS

| | | |
|---|---|---|
| 3,021,379 | 2/1962 | Jackel .................................. 136/146 |
| 3,162,549 | 12/1964 | Jeannin ................................. 136/6 |
| 3,287,164 | 11/1966 | Arrance ................................. 136/30 |
| 3,314,820 | 4/1967 | Smith .................................... 136/6 |
| 3,328,230 | 6/1967 | Levecque et al ..................... 136/146 |
| 3,345,211 | 10/1967 | Lafon et al ........................... 136/6 |

Primary Examiner—Winston Douglas
Assistant Examiner—C. F. Lefevour
Attorney—Max Geldin

[57] ABSTRACT

Electrode-separator unit, designed particularly for high energy density batteries, comprising an organic or inorganic honeycomb matrix, preferably formed of a porous ceramic material, a first electrode material such as zinc positioned in some of the cells of the honeycomb matrix and a second electrode material such as silver positioned in other cells of the honeycomb matrix, such electrode materials being separated by the honeycomb wall; and a battery containing such electrode-separator unit.

12 Claims, 6 Drawing Figures

Patented May 9, 1972

FRANK C. ARRANCE
INVENTOR.

BY Max Geldin
ATTORNEY

FRANK C. ARRANCE
INVENTOR.

BY *Max Geldin*

ATTORNEY

BATTERY CONSTRUCTION HAVING A HONEYCOMB MATRIX WITH CELLS FILLED WITH DIFFERENT ELECTRODE MATERIALS

This invention relates to batteries, particularly high energy density batteries, and is especially concerned with an improved electrode-separator combination fabricated in the form of a unit which can be readily assembled in a case, with suitable electrical connections, to form an efficient battery. Particularly, the invention is directed to the production of a battery construction incorporating a novel form of separator having superior strength, versatility and efficiency as compared to prior art battery separators.

Batteries are an important source of energy storage for power generation. In addition to the common lead-acid storage battery, an important type of battery particularly suited for airborne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries. In addition to important air-borne applications, such high energy density batteries have many other applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and preventing migration of electrode ions or growth of dendritic crystals of electrode ions which short circuit the battery.

Such separators can be constructed of either inorganic or organic materials, the preferred separators usually being inorganic separators. Improved inorganic separators particularly suited for use in high energy density batteries are described, for example, in the copending application of Carl Berger and Frank C. Arrance, Ser. No. 499,274, filed Oct. 21, 1965 (Docket 159) now U.S. Pat. No. 3,364,503. Such inorganic separators, preferably in the form of ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C and above.

However, in connection with the development particularly of inorganic separators in the form of thin ceramic membranes, due to the thinness of such membranes it has been difficult to produce large ceramic membranes for use in larger batteries and also it has been difficult to form these membranes into various shapes and configurations. Thus, while the smaller configurations have proved highly successful, scale-up to larger dimensions using thin ceramic membranes is difficult particularly in the case of planar membranes. It is also difficult to increase the energy density of high energy density cells using conventional plate and separator configurations.

When employing conventional separators in the form of plates or membranes, it is also necessary when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short-circuiting of electrolyte from one electrode compartment around a separator and into the adjacent electrode compartment. Further, when employing certain types of electrodes such as zinc electrodes which tend to slump or change shape in a relatively short period of time because of mechanical or electrochemical deterioration, it is often necessary to support such electrodes between adjacent separators forming the electrode compartment, to provide an electrode of suitable strength to withstand satisfactory periods of operation.

Conventional organic separator plates and membranes have been found particularly deficient because of inferior strength characteristics tending toward rapid deterioration and failing of such organic separators, resulting in poor wet stand, internal shorting and limited useful life.

Accordingly, it is an object of the present invention to provide an electrode-separator unit, particularly an electrode-rigid inorganic separator unit, which affords ease of assembly of an electrode-separator pack in a battery; to provide an electrode-separator unit of the above type which when assembled in a battery automatically provides electrodes and electrode compartments which are substantially fully insulated from each other; and to provide an electrode-separator unit in which the electrodes are supported by the separator assembly so as to provide a sturdy efficiently operating battery unit.

It is a particular object of the invention to provide an electrode-separator unit or combination in which the separator has superior strength characteristics and possesses superior versatility for production in various sizes and shapes, which permits the production of batteries of varying sizes, and which improves the energy density output of the battery.

I have found that the above objects can be accomplished by employing as a battery separator a non-metallic honeycomb, with the electrode materials being positioned in the cells of the honeycomb. The non-metallic honeycomb wall between the cells containing the respective electrode materials provides a suitable separator membrane to permit electrolyte ions to pass or to be conducted through such honeycomb wall, but prevents electrode ions from migrating through such wall or membrane.

Thus, there is provided according to the invention an electrode-separator unit which comprises a non-metallic, preferably porous, honeycomb matrix, a first electrode material positioned in the honeycomb matrix, and a second electrode material positioned in the honeycomb matrix, the respective electrode materials being separated by the honeycomb wall. Thus, the respective electrode materials are disposed in different cells of the honeycomb matrix, each of such electrode materials being disposed in one or more cells of the matrix. Preferably, the first electrode material is positioned in a first series of cells of the honeycomb matrix and the second electrode material is positioned in a second series of cells of the honeycomb matrix. Also, preferably the cells containing the second electrode material are adjacent to the cells containing the first electrode material. Thus, in preferred practice the cells containing one electrode material, e.g., the second electrode material noted above, are in alternate juxtaposition with respect to the cells containing the first electrode material, whereby adjacent first and second electrode materials or electrodes of opposite polarity are separated from each other by a single cell wall.

Although the honeycomb or honeycomb matrix can be formed of an organic material such as a synthetic resin having suitable porosity characteristics, in preferred practice for obtaining substantially greater strength and efficiency, the honeycomb matrix is formed of a porous substantially rigid inorganic material, particularly a porous ceramic material. In addition to enhanced rigidity and strength of the honeycomb separator matrix, the honeycomb can be shaped in any desired manner to produce any desired configuration. Further, due to the geometry of the honeycomb, greater energy density is obtained. For example, a battery formed of a ceramic honeycomb matrix, the cells of which are filled with alternate rows of zinc and silver cells can have an energy density of the order of 50 watt hours per pound or more. Also, large batteries can be produced when employing the invention principles, which can function either as high rate primary or secondary batteries.

The employment of a honeycomb matrix as the separator according to the invention, also has the important advantage that it permits the provision of an electrode-separator unit externally of the battery by first filling the cells of the honeycomb with the suitable electrode materials. When so assembled, an electrode-separator pack is provided in which each of the electrode compartments is insulated from the adjacent electrode compartments by the honeycomb cell walls and wherein each of the electrodes is supported by the surrounding cell wall of the honeycomb, preventing slumping or disintegration of the electrode material, e.g., zinc, within its compartment. One or both of the opposite faces of the honeycomb are preferably covered by a suitable insulation material to close the end or ends of the respective cells containing the electrode materials. Thus, when assembling the electrode-separator unit of the invention in a battery, there is avoided the problem, when employing individual separators and electrodes, of requiring first the proper supporting of such individual separators in suitably spaced relation to provide electrode compartments, and the introduction of the individual electrodes in such compartments, and there is also avoided the necessity under these conditions for providing means to properly insulate adjacent electrode compartments from each other.

The invention will be more clearly understood by reference to the description below of certain preferred embodiments of the invention taken in connection with the accompanying drawing, wherein.

Figure 1:
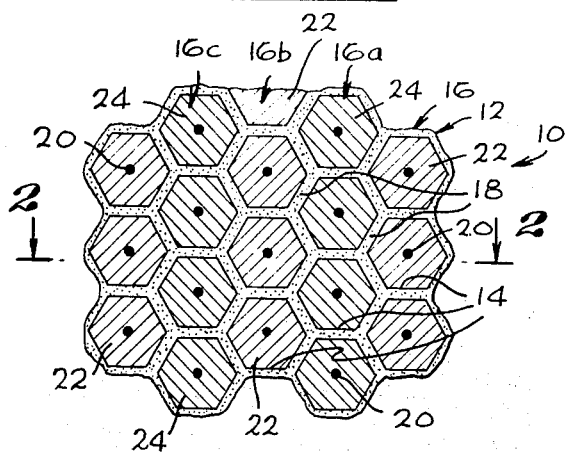
FIG. 1 is a cross-sectional schematic representation of an electrode-separator unit employing a honeycomb matrix according to the invention.

The showings in the drawings are exaggerated for purposes of greater clarity.

In carrying out the invention for obtaining the improved electrode-separator unit indicated at 10 in FIGS. 1 ans 2, a porous non-metallic honeycomb matrix 12, e.g., an aluminum oxide matrix, is first provided. The cells 14 of the honeycomb, here shown as hexagonal cells, are filled with electrode material according to the invention.

Thus, for example, for producing a silver-zinc high energy density battery, the respective rows 16, 16a, 16b, 16c, etc. of cells 14 are arranged to have alternate zinc and silver electrodes; that is, each cell 14 of alternate rows of cells 16 and 16b contain zinc electrodes 22, and each cell 14 of the intermediate alternate rows of cells 16a and 16c contain silver electrodes 24. Thus, the cells containing zinc electrode material are disposed adjacent the cells containing silver electrode material, the cell wall 18 between adjacent zinc and silver-containing cells forming the separator between these electrodes of opposite polarity.

Figure 2:
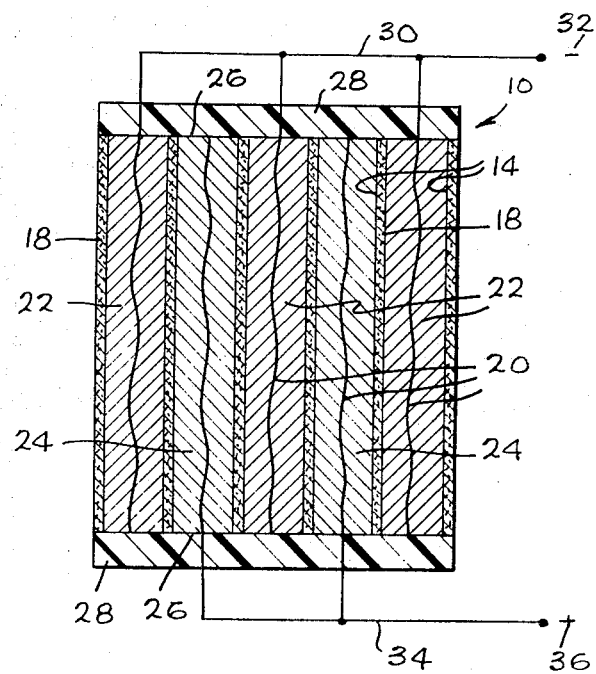
FIG. 2 is a section taken on line 2—2 of FIG. 1.

As illustrated in FIG. 2, a metallic collector screen or wire 20 preferably is embedded in and passes through the respective zinc electrodes 22 and the respective silver electrodes 24 contained in the honeycomb cells 14. The end faces 26 of the honeycomb are covered with an insulation material 28, which can be any suitable type of plastic or synthetic resinous material such as vinyls, epoxies, and the like, which have suitable electrical insulation characteristics. An electrical lead or connection 30 is connected to each of the zinc electrodes 22 contained in the cells of the honeycomb, which in turn is connected to the negative zinc terminal 32, and an electrical connection or lead 34 is connected to each of the silver electrodes 24 in the cells of the honeycomb, and is in turn connected to a positive silver terminal 36.

As previously noted, the honeycomb matrix 12 is preferably formed of an inorganic material. Inorganic separator materials which can be used to form the porous honeycomb 12 can include a variety of substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093, filed June 30, 1964 of Carl Berger et al now U.S. Pat. No. 3,489,610. A preferred separator of this type is hydrous zirconium oxide or zirconia.

Other porous inorganic materials which can be employed for producing the honeycomb separator according to the invention include the aluminosilicates, particularly the alkali metal and alkaline earth metal aluminosilicates, alumina and silica, particularly because of their formation of a hard ceramic material upon sintering, while still retaining suitable porous characteristics. The aluminosilicates are particularly preferred in this respect. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. Such inorganic separator materials are described in the copending U.S. applications Ser. Nos. 378,858, filed June 29, 1964 now abandoned, and 499,294, filed Oct. 21, 1965 of Carl Berger et al now U.S. Pat. No. 3379570.

Another useful class of inorganic separator materials are the naturally occuring clay minerals of the kaolinite group. This is a group of naturally occuring clays containing aluminum oxide and silica usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separators which can be employed include those in the form of a sintered porous member composed of a solid solution of magnesium silicate and zinc silicate, or a solid solution of magnesium silicate and iron silicate as described and claimed in the copending application Ser. No. 539,554, filed Apr. 1, 1966 of Frank C. Arrance et al (Docket 299) now U.S. Pat. No. 3,446,668, and the inorganic separators in the form of a sintered porous member composed of a solid solution of an aluminum-bearing material such as aluminum oxide, and a substance selected from the group consisting of chromium, cobalt, nickel, magnesium, calcium and iron bearing materials, e.g., a mixture of alumina and chromic oxide, as described and claimed in copending application Ser. No. 555,891, filed June 7, 1966 of Frank C. Arrance et al. (Docket 348) now U.S. Pat. No. 3,446,669.

The term "ceramic material" as employed herein is intended to denote types of inorganic materials such as those noted above. Accordingly, a ceramic material of suitable porosity characteristics forms the preferred honeycomb matrix according to the invention.

Various types of known procedures can be employed for producing the preferred porous ceramic honeycomb. Thus, for example, according to one procedure a cardboard or other organic honeycomb can be soaked or immersed in a ceramic slip, e.g., containing aluminum oxide, and then fired. The porosity of the cardboard and the concentration of the ceramic slip control the initial porosity. During firing, the cardboard or other organic material is decomposed and is removed, leaving a ceramic honeycomb whose final porosity can be adjusted by subsequent firing. Alternative procedures can be employed, such as extrusion through a die, by pressing, casting and hydrostatic pressing.

Although not preferred, an organic honeycomb matrix can be employed in the invention. Suitably inert organic materials or plastics having suitable porosity characteristics which can be employed include, for example, microporous plastics such as nylon, Dynel (vinyl-acrylic copolymer), Teflon (polytetrafluoroethylene), cellophane or regenerated cellulose, and the like. Although such organic honeycombs can be employed, the strength, chemical inertness and electrode support characteristics of the inorganic or ceramic honeycombs are significantly superior.

Ion exchange materials can also be employed to produce the honeycomb matrix. These include, for example, aluminum vanadates, thorium phosphates and zirconium phosphates. Also, organic ion exchange materials such as polystyrene type ion exchange materials, can be employed.

The porosity of the materials of which the honeycomb matrix is composed should be such that the walls of the honeycomb function to retain electrolyte, and permit transfer of electrolyte ions but prevent transfer of electrode ions. The honeycomb cell walls preferably have a porosity in the range from about 5 to about 50 percent, usually about 10 to about 30 percent. The above noted porous inorganic ceramic materials in particular have such porosity characteristics. The thickness of the cell walls, e.g., 18, of the honeycomb matrix, particularly where an inorganic honeycomb is employed, can range, for example, from about 0.005 inch to about 0.050 inch, although this range is only understood to be exemplary.

In filling the cells of the honeycomb with the electrode material, the electrode material, e.g., in the form of a paste or powder can be forced into the cells, as by tamping. Alternatively, this can be accomplished by placing a vacuum tight tool over the honeycomb to enable evacuation of the honeycomb, and when so evacuated, the electrode material can be injected into the honeycomb cells in any suitable manner. After the honeycomb is filled with the electrode paste or powder, the electrode materials are permitted to set and dry. Suitable insulation is then provided over one or preferably both of the end faces of the honeycomb as indicated at 28 in FIG. 2, employing organic resins such as, for example, epoxies, polyvinyl resins and rubber type material such as Neoprene type compounds and ethylene-propylene rubbers for this purpose. The electrode-separator unit is then incorporated in a battery with suitable electrical connections, as more fully described below.

Any type of electrode materials can be employed to form an electrode-separator unit employing a honeycomb matrix according to the invention. These include in addition to silver and zinc noted above, silver and cadmium to form a silver-cadmium battery, nickel and zinc for a nickel-zinc battery, nickel and cadmium for a nickel-cadmium battery, and the like. Also, lead acid batteries can be provided employing the principles of the invention, by incorporating suitable lead and lead oxide electrode materials into the honeycomb cells in a manner above described.

After incorporation of the electrode materials into the cells of the honeycomb, and prior to positioning the insulating covers 28 over the end faces of the honeycomb to close the ends of the cells, suitable electrolyte solutions, e.g., an aqueous potassium hydroxide solution for high energy density batteries such as a silver-zinc battery, can be introduced into the honeycomb to impregnate the walls thereof and the electrodes, by vacuum soaking or by other conventional procedures.

Figure 3:
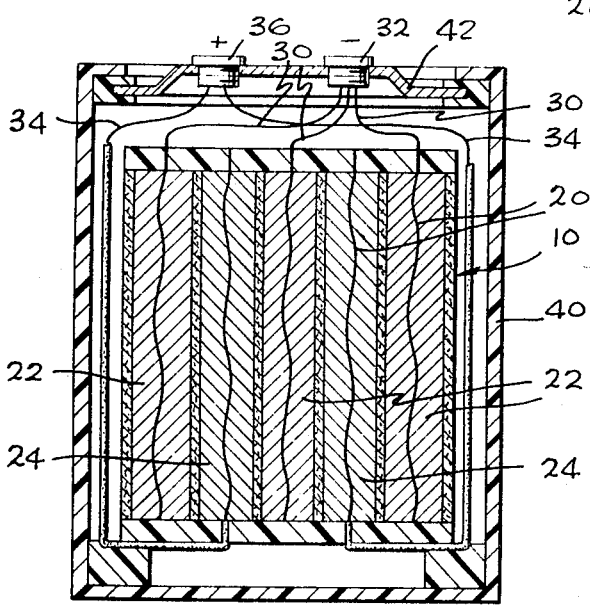
FIG. 3 shows the manner of assembly of an electrode-separator unit according to the invention, to form a battery.

Referring now to FIG. 3 of the drawing, the electrode-separator unit 10 of FIGS. 1 and 2 composed of the honeycomb matrix filled with the zinc and silver electrode materials, can be assembled in a battery case 40 by means of suitable electrical connections. As shown in FIG. 3, the electrical connections or leads 34 from each of the silver electrodes 24 are connected to the terminal 36 mounted on the cover 42 of the battery, and the electrical connections 30 from the zinc electrodes 22 are connected to the terminal 32 similarly mounted on the cover 42 of the battery.

The following are examples of practice of the invention:

EXAMPLE 1

An electrode-separator unit as described above and illustrated in FIGS. 1 and 2 is prepared employing an aluminum oxide inorganic separator having a porosity of about 25 percent. Silver peroxide is filled as by tamping into alternate rows of cells of the honeycomb, and zinc dust is similarly filled into the alternate intermediate rows of cells of the honeycomb. The thus filled honeycomb matrix is then vacuum filled with 30 percent potassium hydroxide solution, and the ends of the honeycomb are covered with a vinyl insulation covering as indicated at 28 in FIG. 2.

The resulting electrode-inorganic separator unit employing the honeycomb matrix is assembled in a battery as generally illustrated in FIG. 3 and the cell is discharged at 10 ma rate for 15 hours. The cell has a voltage plateau of 1.42 volts during this period. The cell is recharged at a 2.05 voltage limit and the cycle is repeated for three cycles. This test demonstrates the capability of the invention system for use in both primary and secondary high energy density batteries.

EXAMPLE 2

A porous inorganic honeycomb formed of a solid solution of magnesium silicate and iron silicate is filled in the manner described above in Example 1, with alternate rows of cells filled with a mixture of zinc oxide containing a small amount of mercuric oxide to form the zinc electrodes, and intermediate alternate rows of cells filled with silver metal powder. The resulting matrix containing the electrode materials is then filled by vacuum filling with 30 percent potassium hydroxide solution, and organic insulation covers positioned as at 28 in FIG. 2 over the opposite faces of the honeycomb.

The resulting electrode-separator unit formed of the inorganic honeycomb matrix is positioned in a battery as illustrated generally in FIG. 3, and the battery is first subjected to electroforming by charging to convert the zinc oxide to zinc and the silver metal to silver oxide. The resulting battery is then discharged and charged over a substantial number of one-half hour discharge — one-half hour charge cycles both at ambient and at elevated temperature of about 100° C. The battery operates efficiently over these discharge-charge cycles, illustrating the suitability of the invention battery system as a secondary high energy density battery.

EXAMPLE 3

An electrode-separator unit formed of an aluminosilicate honeycomb matrix as described above and illustrated in the drawing is filled with silver and cadmium electrode materials in alternate cell rows as described in Examples 1 and 2 above, employing silver metal powder in alternate cell rows of the honeycomb and incorporating cadmium oxide powder in the intermediate alternate cell rows of the honeycomb. The resulting aluminosilicate honeycomb filled with these electrode materials is vacuum filled with 30 to 40 percent potassium hydroxide solution, the end faces of the honeycomb covered with an insulating vinyl cover, and the unit assembled in the battery as described above and illustrated in FIG. 3 above.

The battery is first charged to convert the silver to silver oxide and the cadmium oxide to cadmium, to form the positive and negative electrodes of the battery, respectively. The battery is then subjected to a number of one-half hour discharge — one-half hour charge cycles and exhibits good electrical characteristics as a high energy density secondary battery.

EXAMPLE 4

A nickel-cadmium battery is provided in a manner similar to that described above, employing a honeycomb formed of a solid solution of magnesium silicate and iron silicate, with cadmium oxide powder positioned in alternating cell rows of the honeycomb, and with nickel hydroxide disposed in the intermediate alternating cell rows of the honeycomb.

After impregnation with 30 percent potassium hydroxide solution and the provision of insulating covers on opposite faces of the electrode-separator unit, the resulting unit is assembled in a battery as described above and illustrated in FIG.

3 and the battery is first electroformed to convert the zinc oxide to zinc and to form nickel oxide, as negative and positive electrodes, respectively. Such battery is subjected to one-half hour discharge — one-half hour charge cycles and exhibits efficient electrical characteristics both at ambient and elevated temperatures.

EXAMPLE 5

A silver-zinc battery as described in Example 2 is assembled, except that the honeycomb separator is formed of microporous regenerated cellulose.

Although the battery operates as a secondary battery satisfactorily at ambient temperature, it has a shorter life than the battery of Example 2, employing an inorganic honeycomb matrix, and has limited utility at elevated temperature.

Although in FIG. 1 alternate rows of cells are shown to have zinc electrodes and intermediate alternate rows silver electrodes, any other desired arrangement of these electrodes can be provided. Thus, for example, each of the rows of cells 16, 16a, 16b and 16c can contain alternating zinc and silver electrodes 22 and 24 as illustrated in FIG. 4.

Figure 4:
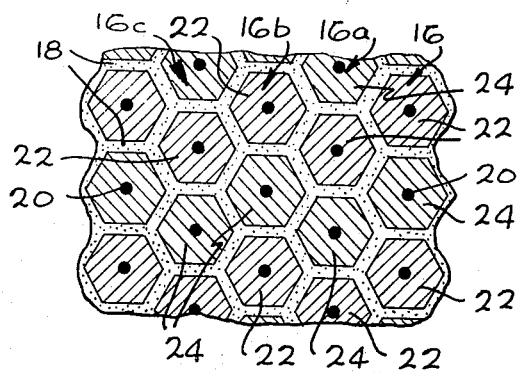
FIGS. 4, 5 and 6 illustrate various modifications of the electrode-separator unit of the invention.
Figure 5:
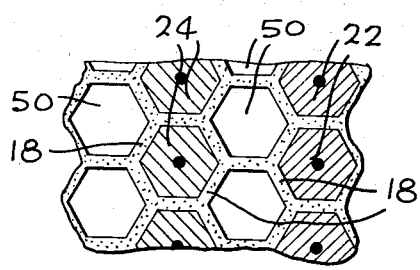

Further, although in preferred practice the electrodes of opposite polarity, e.g., the zinc and silver electrodes, are arranged adjacent each other and separated by a single cell wall, as illustrated in FIGS. 1 and 4, these respective electrodes can be separated by two or more cell walls and hence need not be disposed in adjacent cells of the honeycomb. This embodiment is illustrated in FIG. 5, wherein the zinc and silver electrodes 22 and 24 are not disposed in adjacent cells of the honeycomb, and are separated by two cell walls 18 of the honeycomb, with empty cells 50 of the honeycomb disposed between the zinc and silver electrodes. But this latter arrangement is usually not preferred since it increases the internal resistance of the battery unit. However, where it is desired to promote heat transfer in the unit, e.g., for heat dissipation, such a unit permits the electrolyte to be introduced into and to circulate freely through the empty cells 50, to thus dissipate heat and also remove any undesirable products formed in the cell. For this purpose, the unit is impregnated with electrolyte in a manner so as to flood the cells 50 with electrolyte.

Figure 6:
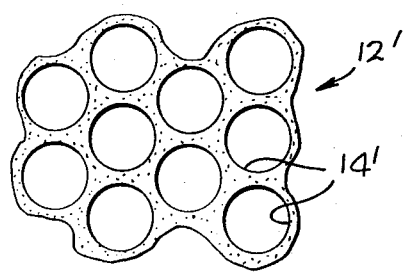

It will be understood also that the cells of the honeycomb matrix can have any desired shape. Thus, although usually such honeycombs are provided with hexagonal cells, such cells can be, for example, circular, as illustrated in the honeycomb matrix 12' in FIG. 6, containing circular cells 14', or of any other polygonal shape. Further, it will be understood that the honeycomb can be cut to any desired size, shape or configuration and can be employed to form large or small high energy density batteries, with honeycombs of any desired depth, to provide superior high energy density as compared to prior art batteries formed of a plurality of relatively thin plates or membranes.

It will also be understood that if desired, only one of the end faces of the honeycomb can be covered with an insulation material, as at 28, or the ends of the honeycomb need not be covered with any insulation material. However, in the latter instance, reduced insulation of the electrode compartments results.

Thus, the invention provides a novel electrode-separator unit permitting ease of assembly of such units in a battery, providing insulation between the respective electrode compartments, and providing support for the electrodes embodied in these units. The battery containing such electrode-separator unit operates efficiently over a substantial number of charge-discharge cycles at both ambient and elevated temperatures.

During discharge of batteries such as those described and illustrated above, as is well known, e.g., in the case of a silver-zinc battery, the zinc converts to zinc oxide and the silver oxide to silver and during charging of such batteries the silver is oxidized to silver oxide and the zinc oxide is reduced to zinc. Because of these reversible reactions, the terms "silver" and "zinc," the terms "silver" and "cadmium," the terms "nickel" and "zinc," and the terms "nickel" and "cadmium," referring to the metals forming the respective electrodes of silver-zinc, silver-cadmium, nickel-zinc and nickel-cadmium battery systems, are intended to denote either the respective metals themselves or the corresponding oxides thereof.

Further, it will be understood that any suitable electrolyte or electrolyte solution can be used in the honeycomb battery unit of the invention, including acidic or basic electrolytes.

While I have described particular embodiments of my invention for purposes of illustration within the spirit of the invention, it will be understood that this invention is not to be taken as limited, except by the scope of the appended claims.

I claim:

1. A high energy density battery comprising a case, an electrode-separator unit positioned in said case, said electrode-separator unit comprising a honeycomb matrix forming an integral continuous bonded separator, said honeycomb matrix formed of (a) a porous ceramic material, (b) a porous plastic, or (c) an ion exchange material, said honeycomb matrix having a porosity or conductivity permitting transfer of electrolyte ions but preventing transfer of electrode ions, and having a plurality of cells defined by a continuous wall of the matrix and said cells thereof having substantially greater depth than the thickness of said wall, first and second active electrode materials selected from the group consisting of zinc, silver, cadmium and nickel, a first said active electrode material substantially filling and contacting at least one of the cells of said honeycomb matrix, and a second said active electrode material of opposite polarity different in composition from said first active electrode material substantially filling and contacting at least one other of said cells of said honeycomb matrix, said active electrode materials being separated by the honeycomb wall, first electrical connections to the first electrodes formed of said first active electrode material, second electrical connections to the second electrodes formed of said second active electrode material, and terminals for said connections.

2. A battery as defined in claim 1, wherein said first electrode material is positioned in a first series of cells of said honeycomb matrix and said second electrode material of opposite polarity is positioned in a second series of cells of said honeycomb matrix.

3. A battery as defined in claim 2, the cells containing said second electrode material being adjacent to the cells containing said first electrode material.

4. A battery as defined in claim 3, wherein said cells containing said second electrode material are in alternate juxtaposition with respect to the cells containing said first electrode material, whereby adjacent electrodes of opposite polarity are separated from each other by a single cell wall.

5. A battery as defined in claim 1, said honeycomb matrix being formed of a porous ceramic material.

6. A battery as defined in claim 1, said honeycomb matrix being formed of a porous ceramic material, and said first electrode material being a zinc electrode.

7. A battery as defined in claim 1, said honeycomb matrix being formed of a porous ceramic material, said first electrode material being a zinc electrode, and second electrode material being a silver electrode.

8. A battery as defined in claim 4, said honeycomb matrix being formed of a porous ceramic material, said first electrode material being a zinc electrode, and second electrode material being a silver electrode.

9. A battery as defined in claim 7, said honeycomb matrix being an alumina honeycomb matrix.

10. A battery as defined in claim 7, said honeycomb matrix being composed of a solid solution of magnesium silicate and iron silicate.

11. A battery as defined in claim 1, said electrode-separator unit containing an alkaline electrolyte.

12. A battery as defined in claim 1, including an insulating cover positioned over the opposite faces of said honeycomb matrix and closing the ends of said electrodes.

* * * * *